(12) United States Patent
Alexandroff

(10) Patent No.: US 11,865,546 B2
(45) Date of Patent: Jan. 9, 2024

(54) MATERIAL EXTRACTING SYSTEM AND METHOD

(71) Applicant: Sharp Pulse Corp., New York, NY (US)

(72) Inventor: Igor Simon Alexandroff, New York, NY (US)

(73) Assignee: Sharp Pulse Corp., New York, NY (US)

( * ) Notice: Subject to any disclaimer, the term of this patent is extended or adjusted under 35 U.S.C. 154(b) by 0 days.

(21) Appl. No.: 18/108,614

(22) Filed: Feb. 11, 2023

(65) Prior Publication Data

US 2023/0256455 A1 Aug. 17, 2023

Related U.S. Application Data

(60) Provisional application No. 63/309,257, filed on Feb. 11, 2022, provisional application No. 63/436,541, filed on Dec. 31, 2022.

(51) Int. Cl.
| | |
|---|---|
| *B02C 19/18* | (2006.01) |
| *B09B 3/35* | (2022.01) |
| *B02C 23/10* | (2006.01) |
| *B09B 101/17* | (2022.01) |

(52) U.S. Cl.
CPC .............. *B02C 19/18* (2013.01); *B02C 23/10* (2013.01); *B09B 3/35* (2022.01); *B09B 2101/17* (2022.01)

(58) Field of Classification Search
CPC ................................ B02C 19/18; B02C 23/10
See application file for complete search history.

(56) References Cited

U.S. PATENT DOCUMENTS

| | | | | |
|---|---|---|---|---|
| 3,060,664 | A | * 10/1962 | Morawski | ................. B04C 5/30 55/460 |
| 3,490,702 | A | 1/1970 | Dore | |
| 3,770,212 | A | * 11/1973 | Kassir | ..................... B02C 19/18 241/1 |
| 3,895,760 | A | 7/1975 | Snyder | |
| 4,313,573 | A | * 2/1982 | Goldberger | ............. B02C 19/18 241/1 |
| 4,313,737 | A | 2/1982 | Massey | |
| 4,540,127 | A | * 9/1985 | Andres | ................... B02C 19/18 241/1 |

(Continued)

FOREIGN PATENT DOCUMENTS

| | | |
|---|---|---|
| DE | 19534232 A1 | 3/1997 |
| DE | 102021205637 A1 | 12/2022 |
| WO | 2017037129 A1 | 3/2017 |

OTHER PUBLICATIONS

International Search Report and Written Opinion issued in App. No. PCT/US23/62472, dated Aug. 14, 2023, 13 pages.

(Continued)

*Primary Examiner* — Faye Francis
(74) *Attorney, Agent, or Firm* — Koffsky Schwalb LLC

(57) ABSTRACT

A system for processing compounds having constituent materials of different mechanical characteristics to extract their constituent materials. The system includes a kinetic impactor configured to impact, via a shockwave, compound particles of a preimpact mixture, thereby creating a postimpact mixture including (i) subparticles of 1st-constituent-material and (ii) reduced-compound particles including a 2nd constituent material.

5 Claims, 7 Drawing Sheets

(56) References Cited

U.S. PATENT DOCUMENTS

| | | | |
|---|---|---|---|
| 5,758,831 A * | 6/1998 | Collins | B02C 19/186 |
| | | | 241/23 |
| 6,360,755 B1 * | 3/2002 | Schantz | B28D 5/0005 |
| | | | 134/22.12 |
| 6,817,556 B2 | 11/2004 | Hesch | |
| 7,677,486 B2 * | 3/2010 | Hoppe | B02C 19/18 |
| | | | 241/1 |
| 8,746,598 B2 * | 6/2014 | Bentaj | B29B 17/02 |
| | | | 241/1 |
| 9,120,101 B2 * | 9/2015 | Bentaj | B09C 1/00 |
| 10,399,085 B2 * | 9/2019 | Müller | B09B 3/00 |
| 2002/0117564 A1 | 8/2002 | Hahn | |
| 2012/0205472 A1 | 8/2012 | Bentaj | |
| 2013/0277464 A1 * | 10/2013 | Mitchell | C10J 3/506 |
| | | | 241/38 |
| 2021/0069724 A1 | 3/2021 | Stark | |
| 2021/0094043 A1 | 4/2021 | Yuan | |

OTHER PUBLICATIONS

Partial European Search Report issued in App. No. EP23156360, dated Jul. 7, 2023, 21 pages.

* cited by examiner

MATERIAL EXTRACTING SYSTEM AND METHOD

REFERENCE TO RELATED APPLICATIONS

This application claims the benefit of U.S. Provisional Application No. 63/309,257, filed Feb. 11, 2022, and of U.S. Provisional Application No. 63/436,541, filed Dec. 31, 2022, each of which is incorporated herein its entirety.

FIELD OF THE INVENTION

This invention relates to a field of processing compounds to extract their constituent materials. Particularly, the invention relates to a system and method for processing compounds having constituent materials of different mechanical characteristics, to extract their constituent materials using kinetic impact technology. The invention is particularly useful for separating various constituent materials having different densities and/or plasticity. The invention is also useful for kinetically breaking down living organisms (e.g., bacteria) suspended in fluids, such as milk, water, etc.

BACKGROUND OF THE INVENTION

These days, many products contain compound materials. When such compound-containing products reach their end of life, instead of being thrown out, they are often sent to recycling facilities, where compound materials are processed to extract the respective constituent materials. Such recycling may be especially useful when one or more of the constituent materials is expensive. There are many examples of such products, like solar panels and semiconductor chips. For example, solar panels comprise metal plated over glass and/or silicon. Another example includes circuit boards printed with metallic conductors (e.g., copper, silver, etc.) Yet another example of products containing compound materials with an expensive constituent material is the catalytic converter of an internal combustion engine. Catalytic converters typically include ceramic that is plated with platinum group metals—PGM (PGM-plated ceramic compound), the latter being an expensive precious metal mixture. Note, the ceramic may also include metal oxide ceramic, such as Aluminum oxide ($Al_2O_3$) ceramic for a PGM bonding layer. Although the amount of PGM in a catalytic converter may be small, e.g., weight ratio of ceramic to PGM may be 99.9 to 0.1, the cost of PGM may make extraction of PGM from the compound worth it.

Another example are unrefined ores containing traces of metals requiring extraction, such as gold ore from mining operations, which includes unrefined ore with traces of gold.

Prior art extraction methods, however, are complex, expensive, and require a long time to complete. Moreover, prior art extraction methods involve using high temperatures and complicated chemical processes with hazardous materials.

Separately, humans come in contact with many different fluids that may be contaminated with pathogenic organisms, such as bacteria. For example, to eliminate pathogens in milk and juices and extend their shelf life, these products typically undergo pasteurization, a process that requires the product to be treated with heat over time. Afterwards the product is cooled. Not only can the pasteurization equipment be expensive, but the process itself, requiring generation of heat energy, is expensive and time consuming. Moreover, heating of liquid products, e.g., as milk and juices, can also destroy their beneficial features such as vitamins and minerals.

Public swimming pools can be another example where humans can come into contact with pathogens. Specifically, to eliminate pathogens in swimming pools, pool water is generally treated with chlorine. This process, however, requires expensive equipment and constant monitoring of chlorine levels. Moreover, while chlorinated pool water may kill pathogenic organisms, it can also irritate skin and may cause severe allergic reaction in some swimmers. Furthermore, chlorinated pool water has an unpleasant odor, which can act as a disincentive for people to use public swimming pools.

What is needed is a system and method that overcomes the problems of the prior art.

What is needed is a material extracting system and method that is fast, efficient, and inexpensive.

What is also needed is a material extracting system and method that does not require the use of high temperatures or chemical processes.

What is also needed is a fluid treatment system and method that is fast, efficient, and inexpensive.

What is also needed is a water treatment system and method that does not introduce chemicals into the water that can cause skin irritation, allergic reactions, or unpleasant odors.

SUMMARY

The present invention is generally directed to a system and method for decontaminating fluids and also for processing compounds containing constituent materials having different mechanical characteristics, such as densities. For the purpose of explaining the invention, the following discussion assumes that a bulk compound material includes two constituent materials: material A (first constituent material) and material B (second constituent material). Note, however, each of the constituent materials could itself be a distinct compound.

In one embodiment of the invention, the system includes such elements as: a) a grinder, configured to grind a bulk compound material into an initial mixture of tiny particles (micron-sized or nano-sized) comprising compound particles, particles of a first constituent material (A-particles), and particles of a second constituent material (B-particles); (b) a first-stage separator (also referred to as "a pre-processing separator"), configured to separate the particles into at least two groups based on their respective mechanical properties, such as weight, density, and/or elasticity. For example, based on a mechanical characteristic, the preimpact separator separates B-particles from the initial mixture, resulting in the separated B-particles and a preimpact mixture comprising compound particles; (c) a kinetic impactor, configured to acoustically impact the compound particles of the preimpact mixture to separate from them subparticles of the first-constituent-material (A-subparticles), thereby resulting in a postimpact mixture including (i) A-subparticles and (ii) reduced-compound particles comprising the second constituent material; and (d) a second-stage separator (also referred to as "a postimpact separator"), configured to separate the reduced compound particles from the postimpact mixture based on a mechanical property, such as weight, density, etc, The A-subparticles, however, stay with the remaining postimpact mixture, which can be referred to as a reduced postimpact mixture.

The grinder is used to break up a bulk compound into tiny, preferably "molecular" size, particles that are then fed into the preimpact separator. For example, the grinder can break up the bulk compound material comprising two constituent materials A and B, such as PGM-plated ceramic, into compound ("AB") particles (such as PGM-plated ceramic particles), material-A particles (such as PGM-only particles), and material-B particles (such as ceramic-only particles). (As mentioned above, because the bulk PGM-plated ceramic compound may include metal oxide ceramic, the grinder may also produce tiny particles of metal-oxide-ceramic. Because the presence of such metal-oxide-ceramic particles does not detract from operation and advantages of the present invention, however, such particles will not be referenced in the explanation that follows.) Output of the grinder may also include larger pieces of materials. All of these elements are fed into the first-stage separator (preimpact separator).

The first-stage separator is used to separate particles of one of the constituent materials from the rest of the particles based on their mechanical property, such as weight. As explained in more detail below, when the particles a tiny and substantially equal in size, weight-based separation transforms into density-based separation. In one embodiment, the first-stage separator is a gas-cyclone separator (in case if initial grinder produces dry mix). In another embodiment, when initial grinder produces wet initial mix (water- or other fluid), the first-stage separator is a hydrocyclone separator. For example, when the tiny particles outputted by the grinder are of substantially the same size, if material A has higher density than material B, the first-stage separator can separate material-B particles (e.g., ceramic-only particles) from both the material-A particles (e.g., PGM-only particles) and AB compound particles (e.g., PGM-plated-ceramic particles). The separated material-B particles can be collected, while the material-A particles and the AB compound particles are fed into the kinetic impactor.

The kinetic impactor is used to acoustically impact the AB compound particles (e.g., the PGM-plated ceramic particles), causing material A (e.g., PGM) in a compound particle to separate from material B (e.g., ceramic) in the compound particle, thus generating material-A subparticles (e.g., PGM-only subparticles) and reduced-compound particles, which in the present example will be material-B subparticles only (e.g., ceramic only subparticles). The impactor also impacts the material-A particles present in the preimpact mixture. These particles, however, will either not be affected by the impactor or will break into smaller material-A particles. Regardless, however, as long as these A-particles are heavier than the B-particles, the A-particles will appear in the postimpact mixture, as a portion of the constituent material-A being extracted. In one exemplary embodiment, the invented kinetic impactor uses hydroelectric immersed technology ("HIT") to impact particles suspended in fluid. In other embodiments, the system may use known types of kinetic impactors.

HIT is known to use high voltage discharge pulses between two precisely gapped (spaced) electrodes for electrical breakdown to create explosions within fluid media, such as water. At the moment of the breakdown, a discharge zone is formed, wherein the pressure and temperature in which can reach over $10^{13}$ Pa and over 20,000 degrees Celsius. The discharge zone transforms into a relatively small plasma zone (ball) in the fluid media. The shockwave generated by the electric explosion transmits a powerful impulse of kinetic energy into the fluid, which forces the shockwave in all directions. No additional gases and/or fluids are generated: the plasma ball is created from surrounding fluids by their evaporation and ionization with consequent back condensation to the same volume without any chemical reaction and/or conversion.

When constituent materials A and B of a compound particle suspended in fluid inside an HIT impactor have sufficiently different density and/or ductility. (e.g., density of PGM is much greater than of ceramic, and ceramic and PGM have different Young modulus), the shockwave impacting (hitting) such compound particle causes material A of the compound particle to mechanically separate from material B, creating material-A-only subparticle (e.g., PGM-only subparticle) and a reduced-compound particle, which in the present example would be a material-B-only subparticle (ceramic-only subparticle). The material-A subparticles (e.g., PGM subparticles) and material-B subparticles (e.g., ceramic subparticles), together with any possibly unaffected material-A particles, are then fed into the second-stage separator (postimpact separator), which could be another cyclone-type, centrifuge-type separator, or heavy-fluid separator.

The postimpact separator is used to separate the reduced-compound particles (which in this example are the material-B subparticles) from the material-A subparticles and any unaffected material-A particles that passed through the impactor and were in the postimpact mixture, based on a mechanical property, preferably density.

By the preimpact separator separating material-B particles from the initial mixture and by the postimpact separator separating from the postimpact mixture the reduced-compound particles (material-B subparticles), material A can be fully extracted from the bulk compound material. Moreover, one skilled in the art will also appreciate that extracting material A from the bulk compound as described above effectively also extracts material B. Note, the two separators may be of the same type or of different types, and may separate particles/subparticles based on the same or on different mechanical characteristics.

In another embodiment, the invention uses an HIT-type kinetic impactor to destroy pathogenic organisms suspended in fluids that are either ingested (e.g., drinking water, milk, juices, etc.) or contact humans or animals externally (e.g., public swimming pools, etc.). In such an embodiment, the invention uses a shockwave, generated by an HIT-type kinetic impactor, to impact the pathogens (e.g., bacteria) suspended in a fluid media, thereby ripping the pathogenic organisms and killing them. Unlike the prior art methods, the fluid does not need to undergo any chemical or temperature treatment, thus greatly simplifying and speeding up the overall process.

In one embodiment of the invention, a material extracting system processes compounds comprising constituent materials of different mechanical characteristics. The system includes: a kinetic impactor comprising a housing and an acoustic shockwave generator located within the housing, wherein the housing comprises an output port, and wherein the acoustic shockwave generator is configured to generate an acoustic shockwave for impacting a preimpact mixture including a plurality of compound particles, wherein each compound particle comprises a first constituent material and a second constituent material, the acoustic shockwave capable of causing the first constituent material to separate from an at least one compound particle of the plurality of compound particles, thereby resulting in a postimpact mixture comprising (i) an at least one first-constituent-material subparticle and (ii) an at least one reduced-compound particle comprising the second constituent material; and a postimpact separator comprising a separation chamber having an input port that is coupled to the output port of the kinetic impactor, the postimpact separator comprising a first output port and a second output port, the postimpact separator configured to separate the at least one reduced-compound particle from the postimpact mixture based on a first mechanical characteristic, thereby resulting in (i) the at least one separated reduced-compound particle, and (ii) a reduced postimpact mixture comprising the at least one first-constituent material subparticle.

In one embodiment, the postimpact separator is a cyclone-type separator configured to output the reduced postimpact mixture on the cyclone-type separator's first output port, and to output the at least one separated reduced-compound particle on the cyclone-type separator's second output port. In one embodiment, the first output port of the postimpact separator is coupled to an input port of the kinetic impactor.

In one embodiment, the system further includes a preimpact separator comprising a separation chamber having (a) a first output port coupled to an input port of the kinetic impactor, and (b) a second output port; wherein the preimpact separator is configured to: (i) accept an initial mixture comprising (a) the plurality of compound particles and (b) a plurality of second-constituent-material particles, (ii) based on a second mechanical characteristic, separate from the initial mixture at least one second-constituent-material particle, resulting in the at least one separated second-constituent-material particle and the preimpact mixture, (iii) output the preimpact mixture from the first output port of the preimpact separator, and (iv) output the at least one separated second-constituent-material particle from the second output port of the preimpact separator.

In one embodiment, the system further comprises a grinder having an output port coupled to an input port of the preimpact separator, the grinder configured to grind a bulk compound material into the initial mixture and to output the initial mixture from the grinder's output port. In one embodiment the grinder is a mill-type grinder.

In one embodiment, the kinetic impactor is an HIT-type impactor, wherein the kinetic impactor's housing comprises a first chamber substantially filled with a first fluid, and wherein the acoustic shockwave generator is located within the first chamber. In one embodiment, the first fluid comprises a surface-active fluid.

In one embodiment of HIT-type impactor, the acoustic shockwave generator comprises a pair of gapped electrodes, wherein the first chamber is configured to be substantially filled with a first fluid, and wherein the acoustic shockwave generator is configured to generate the acoustic shockwave by causing an electrical breakdown of the first fluid in a gap between the pair of gapped electrodes.

In one embodiment of the HIT-type impactor, the first chamber includes (i) an input port for allowing the preimpact mixture suspended in the first fluid to enter the first chamber, and (ii) an output port for allowing the postimpact mixture suspended in the first fluid to exit the first chamber.

In one embodiment of the HIT-type impactor, the pair of gapped electrodes includes a plurality of pairs of gapped electrodes, and the first chamber includes a peripheral wall comprising a pair of wall-sections, wherein an interior surface of each wall-section of the pair of wall-sections has a cylindrical parabolic shape, and wherein the wall-sections of the pair of wall-sections face each other; wherein each wall-section of the pair of wall-sections is associated with a corresponding pair of gapped electrodes of the plurality of pairs of electrodes; and wherein, for each wall-section of the pair of wall-sections, the gap between the gapped electrodes of the wall-section's corresponding pair of gapped electrodes substantially coincides with a focus axis of the section's cylindrical parabolic shape.

In one embodiment, the HIT-type impactor further includes a second chamber fluidly isolated from the first chamber by an interior wall, the second chamber comprising (i) an input port for allowing the preimpact mixture suspended in a second fluid to enter the impactor, and (ii) an output port for allowing the postimpact mixture suspended in the second fluid to exit the impactor; wherein the interior wall comprises a shockwave-transmission section configured to transmit the acoustic shockwave from the first chamber to the second chamber without the acoustic shockwave losing a substantial amount of energy. In one embodiment, the first fluid is identical to the second fluid.

In one embodiment of the invention, a material extracting method for processing bulk compound material comprising constituent materials of different mechanical characteristics, the method includes the steps of: using a kinetic impactor to impact a preimpact mixture via an acoustic shockwave, the preimpact mixture comprising a plurality of compound particles, wherein each compound particle comprises a first constituent material and a second constituent material, thereby causing the first-constituent-material to separate from an at least one compound particle of the plurality of compound particles, resulting in a postimpact mixture comprising (i) an at least one first-constituent-material subparticle and (ii) an at least one reduced-compound particle comprising the second constituent material, and using a postimpact separator to separate the at least one reduced-compound particle from the postimpact mixture based on a first mechanical characteristic, thereby resulting in (i) the at least one separated reduced-compound particle, and (ii) a reduced postimpact mixture comprising the at least one first-constituent-material subparticle.

In one embodiment, the method further comprises the step of, prior to the step of using a kinetic impactor, using a preimpact separator to: (i) accept an initial mixture comprising (a) the plurality of compound particles and (b) a plurality of second-constituent-material particles; (ii) based on a second mechanical characteristic, separate from the initial mixture at least one second-constituent-material particle, resulting in the at least one separated second-constituent-material particle and the preimpact mixture, (iii) output the preimpact mixture from the first output port of the preimpact separator; and (iv) output the at least one separated second-constituent-material particle from the second output port of the preimpact separator.

In one embodiment, method further includes the step of, prior to the step of using a preimpact separator, using a grinder to (a) grind a bulk compound material into the initial mixture; and (b) output the initial mixture from an output port of said grinder.

BRIEF DESCRIPTION OF THE FIGURES

The accompanying figures, where like reference numerals refer to identical or functionally similar elements throughout the separate views, together with the detailed description below, are incorporated in, form part of the specification, and serve to further illustrate embodiments of concepts that include the claimed invention and explain various principles and advantages of those embodiments.

Skilled artisans will appreciate that elements in the figures, which form a part of this disclosure, are illustrated for simplicity and clarity and have not necessarily been drawn to scale. For example, the dimensions of some of the elements in the figures may be exaggerated relative to other elements to help improve understanding of embodiments of the present invention.

Figure 1:
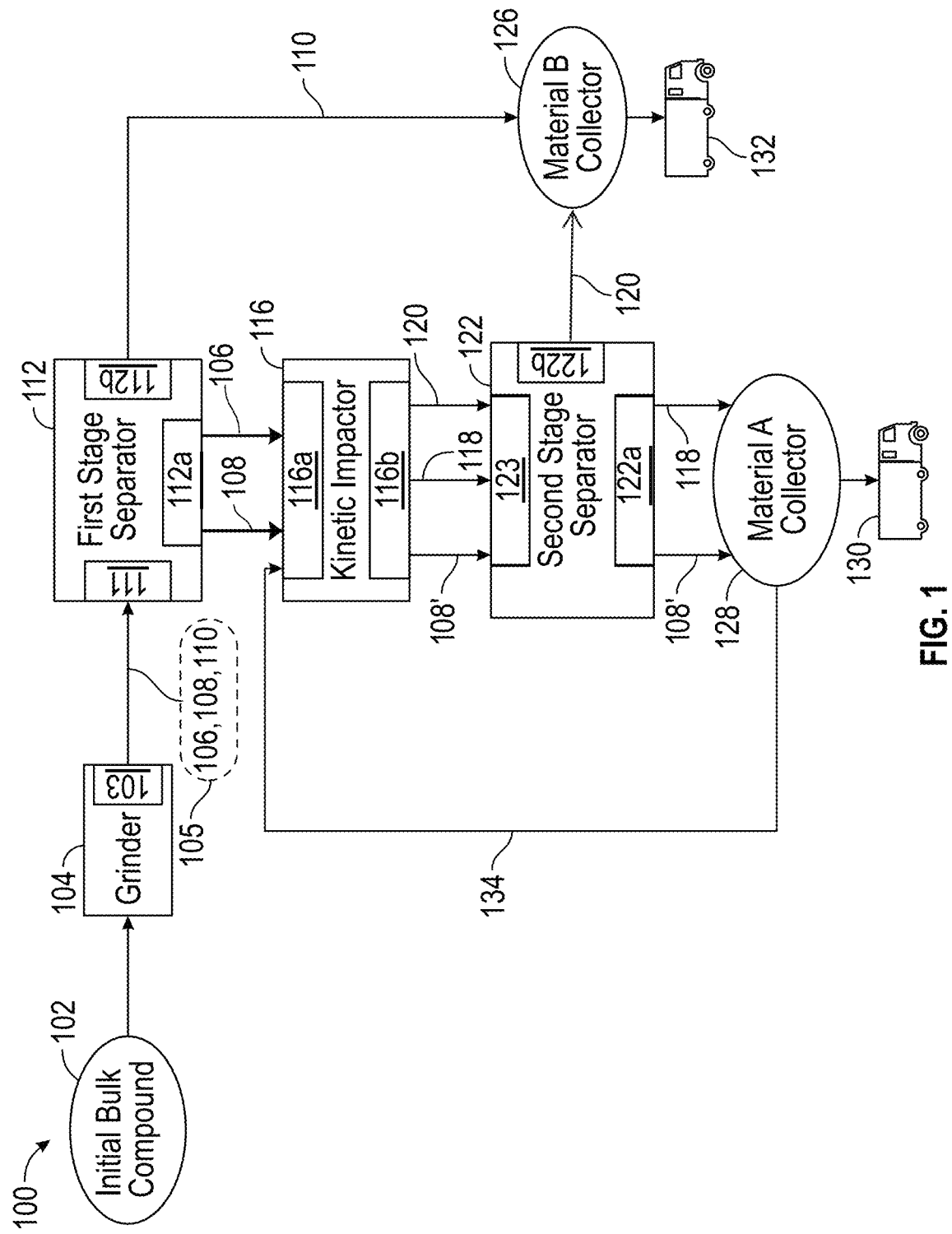
FIG. 1 shows a system and its workflow according to an embodiment of the invention.

The system and method components have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

DETAILED DESCRIPTION

The following detailed description discloses several embodiments of the system and method of the present invention.

As mentioned above, the invented system can be used for killing pathogens suspended in a fluid and can also be used to process compounds in order to extract their constituent materials, where constituent materials differ in their mechanical characteristic, such as in their respective densities, ductility, and/or brittleness.

FIG. 1 illustrates a material extracting system 100 according to an embodiment of the invention. FIG. 1 also conceptually illustrates the processes that take place in the different stages within the system.

Specifically, FIG. 1 shows the system 100 of the present invention comprising a grinder 104, a first stage (preimpact) separator 112, a kinetic impactor 116, and a second stage (postimpact) separator 122. FIG. 1 also shows a material-A collector 128 and a material-B collector 126, as well as transportation means for delivery of the collected materials labeled as references 130 and 132 respectively, to their ultimate destinations.

The grinder 104 is used to grind up an initial bulk compound (junks of compound material) 102 into tiny particles that are then operated on by the other elements of the system 100. Some of the particles resulting from the grinding operation are compound particles and others are particles of the compound's constituent materials. The grinder 104 grinds the initial bulk compound into particles sufficient for granulated separation, preferably into micron-size particles, e.g., 1-100 µm, or even into nanometer-size particles. Preferably, the resulting particles should come close to the nano- or molecular size of the materials making up the compound. One example of the grinder 104 is a ball-mill grinder known in the art, such as the grinder disclosed in U.S. Pat. No. 5,383,615, which is incorporated herein by reference. Another example of the grinder is a jet-mill grinder known in the art.

Grinding the initial bulk compound material into tiny particles increases percentage of a material in the resulting compound particles as compared to its percentage in the initial bulk compound material. When the size of tiny compound particle is on the order of "molecular" size (e.g., micrometers or nanometers), the increase is very large. For example, while a particular material may constitute a very small percentage of the weight of the bulk compound material. e.g., less than 1%, the weight of the material in the compound particle may constitute 50%, or even greater, of the weight of compound particle. This increase is taken advantage of the separator stages that follow.

For example, when a bulk compound 102 having two constituent materials, A and B, is fed into the grinder 104, the grinder may break the bulk compound 102 into an initial mixture 105 comprising three types of tiny particles: (i) compound particles (AB-particles) 106, (ii) particles of the constituent material A (A-particles) 108, and (iii) particles of the constituent material B (B-particles) 110. The initial mixture 105 is then fed into the first-stage separator 112. This is illustrated in FIG. 1 by showing an initial mixture 105, comprising the above-described particles 106, 108, and 110, being transported from an output port 103 of the grinder into an input port 111 of the first stage separator 112.

The first-stage separator 112 then separates particles of one constituent material from the rest of the particles in the initial mixture based on their mechanical properties, such as weight, density, and/or ductility. For example, as shown in FIG. 1, the first-stage separator 112 separates the B-particles (reference 110) from the AB compound particles 106, as well as the A-particles (reference 108).

Where A-particles and B-particles have similar size but the materials themselves have sufficiently different densities, a cyclone-type separator(s), known in the art, may be used. One example of a cyclone separator is a gas-cyclone separator disclosed in U.S. Pat. No. 3,060,664, which is incorporated herein by reference. Another example of a cyclone separator is a hydro-cyclone separator disclosed U.S. Pat. No. 5,819,955, the disclosure of which is incorporated herein by reference.

Cyclone-type separators are generally known to separate particles based on their weight. When the particles are of similar size but of different materials, weight-based separation equates to separation based on material densities. Thus, assuming material A has sufficiently greater density than material B, material-A particles (reference 108) will be sufficiently heavier than similar size material-B particles (reference 110). As a result, the first stage separator will separate material-B particles from material-A particles and output them at different output ports of the separator.

As the same time, whether a compound particle will be outputted together with the material-A particles or together with the material-B particles will depend on the compound particle's weight.

If the tiny particles 106, 108, and 110 of the preimpact mixture 105 coming out of the grinder 104 have the same size, the weight of each compound particle 106 will depend on two factors: (i) relative amounts of constituent materials A and B in each compound particle, and (ii) densities of the constituent materials A and B. When the size of all the particles is normalized to 1, the weight Wc of each compound particle 106 can be expressed by the following formula:

$$Wc = (X*Da) + [(1-X)*Db],$$

where X is the relative amount of material A in the compound particle 106, Da is the density of material A, and Db is the density of material B. When material A constitutes a significant portion of a compound particle and has a sufficiently greater density than material B, the weight of the compound particle will be closer to the weight of the material-A particle. In such a scenario, the compound particle will be outputted by the separator on the same output port as the material-A particles.

The example below explains operation of the preimpact separator when material A is 10 times denser than material B and when it constitutes 50% of a compound particle. In such a scenario, Wc=(0.50*Da)+[(1.00−0.50)*(Da/10)], which can be rewritten as Wc=(0.50*Da)+(0.05*Da)=0.55*Da=5.5*Db. In other words, the weight of each compound particle 106 will be slightly over one half of the weight of each A-particle 108 and over 5 times the weight of each B-particle 110. Given that the resulting weight of each compound particle 106 is much closer to the weight of each A-particle 108 than to the weight of each B-particle 110, the separator 112 will output the compound particles 106 on port 112a, together with the A-particles 108, as shown in FIG. 1. While, in the above example, density of material A was assumed to be 10 times greater than the density of material B, the present invention can operate on materials whose densities differ by as low as a factor of 2.

With the B-particles (reference 110) separated from the other particles, i.e., compound particles (reference 106) and A-particles (reference 108), the B-particles 110 can be collected in the material-B collector 126. At the same time, the compound particles 106 and A-particles 108 may be fed into an input port 116a of the kinetic impactor 116.

This post-grinder, first stage separation removes B-particles 110, which don't have material A, from the compound particles 106 and material-A particles 108 that are going to the kinetic impactor 116, to increase its processing and separation efficiency by reducing the volume of materials to be impacted.

In one preferred embodiment, the kinetic impactor 116 is an HIT-type kinetic impactor that kinetically impacts elements suspended in fluid. Because the particles that are fed into the HIT impactor are suspended in fluid, such as water, mixing of the fluid with the particles can be performed at any prior stage in the HIT process. For example, some grinders may use fluid during the grinding process, in which case the resulting tiny particles coming out of the grinder are in pulp form. In one embodiment, the fluid, e.g., water, in which the particles are suspended, can include liquid additives, e.g., surface active liquids, allowing the fluid to penetrate further into a compound particle structure and enabling shockwave delivery deeper into the compound particle. This, in turn, can increase efficiency of the impacting stage.

Fluid may also be mixed with dry particles after they come out from the grinder but before they enter the first stage (preimpact) separator. This is particularly useful when the first-stage separator is a hydro-cyclone type separator.

Alternatively, the particles can be initially separated using gas cyclone and mixed with fluid afterward.

In another embodiment, particles that are fed into the kinetic impactor 116 can be mixed with a fluid after the separator but before particles' entry into the impactor.

In its basic form, an HIT impactor for use with the invented system includes a fluid filled metallic chamber and a pair of precisely gapped electrodes located inside the chamber. During operation, one or more high voltage discharge pulses are applied across the electrodes. (Note: each of the repetition, energy, duration, and/or number of discharge pulses may be controllable.) When a high voltage discharge pulse is applied across the electrodes, a HIT plasma explosion occurs in the fluid media between the electrodes. The shockwave created by the plasma explosion travels through the fluid media, impacting (hitting, compressing and tensing) all elements that are suspended in the fluid. For example, when the element suspended in the fluid is a pathogenic microorganism, the shock wave hitting the microorganism will rip the microorganism apart, killing it. (Note, when the invention is used to kill pathogenic microorganisms, the grinding and separating stages, shown in FIG. 1, may not be needed.)

On the other hand, when the element is a composite particle comprising constituent materials of different densities and/or elasticities, the shockwave impacting the composite particle will cause the constituent materials to separate. To an extent the fluid also includes suspended particles of a single material, the shockwave may cause that material to break up, merely reducing the respective particle's size.

With reference to FIG. 1, assuming the compound particles include only two constituent materials A and B, the compound particles 106 would break up into: i) subparticles of material A (A-subparticles), reference 118; and (ii) subparticles of material B (B-subparticles), reference 120. At the same time, A-particles 108 being of uniform density, because they are material-A only, would not undergo such material separation but might be merely broken up, if at all, into smaller size particles 108' of A material, which would still make then heavier than the B-subparticles. This is conceptually shown by references 106 and 108 at the input port 116a of the impactor 116, and references 108', 118, and 120 at the output port 116b of the impactor. In cases where the compound particle 106 includes more than two constituent materials, separation by the kinetic impactor of the A-subparticle 120 from the compound particle 106, results in the compound particle 106 becoming a reduced-compound particle 120 comprising B material as one of its constituent materials. In such a scenario, however, the invented system still enables extraction of material A.

With the constituent materials of compound particles separated within the fluid inside the kinetic impactor 116, the fluid with all the particles and subparticles in it, references 108', 118, and 120, collectively referred to as a postimpact mixture, can be passed to an input port 123 of a second stage (postimpact) separator 122, for further separating of the constituent materials. The second-stage separator 122 could be a cyclone-type separator (i.e., weight-based separation), a filter separator (size-based separation), centrifugal separator, or any other structure known in the art for separating materials based on their mechanical properties. In another embodiment the separator could separate particles based on other material properties, such as electrical properties, or using floatation techniques or using a heavy fluid whose density is lower than one constituent material and higher than another constituent material.

Assuming that the second-stage separator 122 is a cyclone-type separator, it would separate the incoming A-particles 108, A-subparticles 118, and reduced-compound particles 120 based on their relative weights into two groups. Assuming only two material A and B, because the weight Wc of each compound particle is composed of the weight of material A, previously expressed as X*Da, and of the weight of material B, previously expressed as [(1−X)*Db], knowing densities of the constituent materials and their relative amounts in a compound, allows one to determine how the different particles and subparticles will be grouped at the outputs of the second-stage separator.

Coming back to our example, where material A constitutes 50% of the weight of the compound particle by and is 10 times denser than material B, each compound particle 106 will weighs 5.5*Db. When a compound particle 106 is broken up by the kinetic impactor 116 into an A-subparticle 118 and a reduced-compound particle 120, the A-subparticle will weight 0.50*Da=0.50*(10*Db)=5.0*Db and the reduced-compound particle, which in this example is also just a B-subparticle, will weigh 0.50*Db. Accordingly, the second-stage separator 122 would separate the A-particles 108' weighing about 10*Db, A-subparticles weighing 5.0*Db, and reduced-compound particles weighting 0.5*Db. Given that the reduced-compound particle 120 would weigh much less than each of the A-particle 108' and the A-subparticle 118, the second-stage separator 122 would output the reduced-compound particles B-subparticles 120 at one output port (reference 122*b*), while outputting the A-particles 108' and the A-subparticles 118 at another output port (reference 120*a*).

In FIG. 1, this is conceptually shown by the reduced-compound particles 120, which in this case are just the B-subparticles, being outputted at port 122*b* of the second-stage separator 122 into material-B collector 126, while a reduced postimpact mixture comprising A-particles 108' and A-subparticles 118 is being outputted at port 122*a* of the separator and into the material-A collector 128. Once the A and B materials have been collected in their respective collectors, they can be transported to other locations. This is conceptually shown in FIG. 1 by transport vehicles 130 and 132.

To an extent some of the compound particles 106 are not broken up by the kinetic impactor 116 these compound particles, would still be fed into the second-stage separator 122 as a part of the post-impact mixture. Because each of such compound particles weighs 5.5*Db (based on the above example), each will also be outputted by the separator on port 122*a* as a part of a reduced postimpact mixture. To improve extraction efficiency, these compound particles by themselves or as a part of the reduced-postimpact mixture could be fed back (directly or indirectly) into the input port 116*a* of the kinetic impactor 116 for further impacting. In such a case, the system in FIG. 1 would have the output port 122*a* of the separator 122 coupled, via line 134, to the input port 116*a* of the kinetic impactor 116. In other words, extraction of material A could be performed via a partially closed processing cycle.

In another embodiment, instead of feeding the reduced postimpact mixture back into the kinetic impact 116, the system may feed the reduced postimpact mixture into another, second, impactor.

As a result, the invented system 100 efficiently and cost effectively breaks a compound into its constituent materials, allowing each constituent materials to be extracted and separately collected.

An example of real-world application of the above system and method is in processing PGM-plated ceramic compounds present in catalytic converters of vehicles using internal combustion engines. The grinder 104 can be used to grind the PGM-plated ceramic bulk, creating three types of tiny particles: (i) ceramic particles; (ii) PGM particles; and (iii) PGM-plated ceramic particles, i.e., compound particles. These three types of particles may be fed into the first stage separator 112 that would separate the particles into two groups: i) PGM particles and the PGM-plated ceramic particles; and ii) the ceramic particles. The first group is fed into the kinetic impactor 116, such as an HIT-type impactor. Due to very different mechanical properties of ceramic and PGM, an acoustic shockwave in the HIT impactor causes PGM to separate from the ceramic, thus breaking up the PGM-plated ceramic particles into PGM subparticles and ceramic subparticles. The HIT impactor 116 outputs both types of subparticles, as well as the originally fed PGM particles. From there, the PGM particles and both types of subparticles are fed into the second-stage separator 122, which separates the ceramic subparticles from both the PGM particles and the PGM subparticles. Once separated, PGM, ceramic, or both materials can be separately collected. As a result, the present system can extract ceramic from PGM-plated ceramic compounds by collecting ceramic particles from the first-stage separator 112 and by collecting ceramic subparticles from the second-stage separator 122. At the same time, the system also extracts PGM from PGM-plated ceramic compounds by collecting PGM particles and PGM subparticles from the second-stage separator 122.

While the kinetic impactor 116 in the exemplary embodiment of the system in FIG. 1 is shown to impact a preimpact mixture outputted by the separator 112, in another embodiment the kinetic impactor may impact the initial mixture 105, in which case the first stage separator 112 may not be needed. In yet another embodiment of the invented system, the kinetic impactor may impact the initial bulk compound 102 directly, in which case both the grinder and first stage separator may not be needed.

Figure 7:
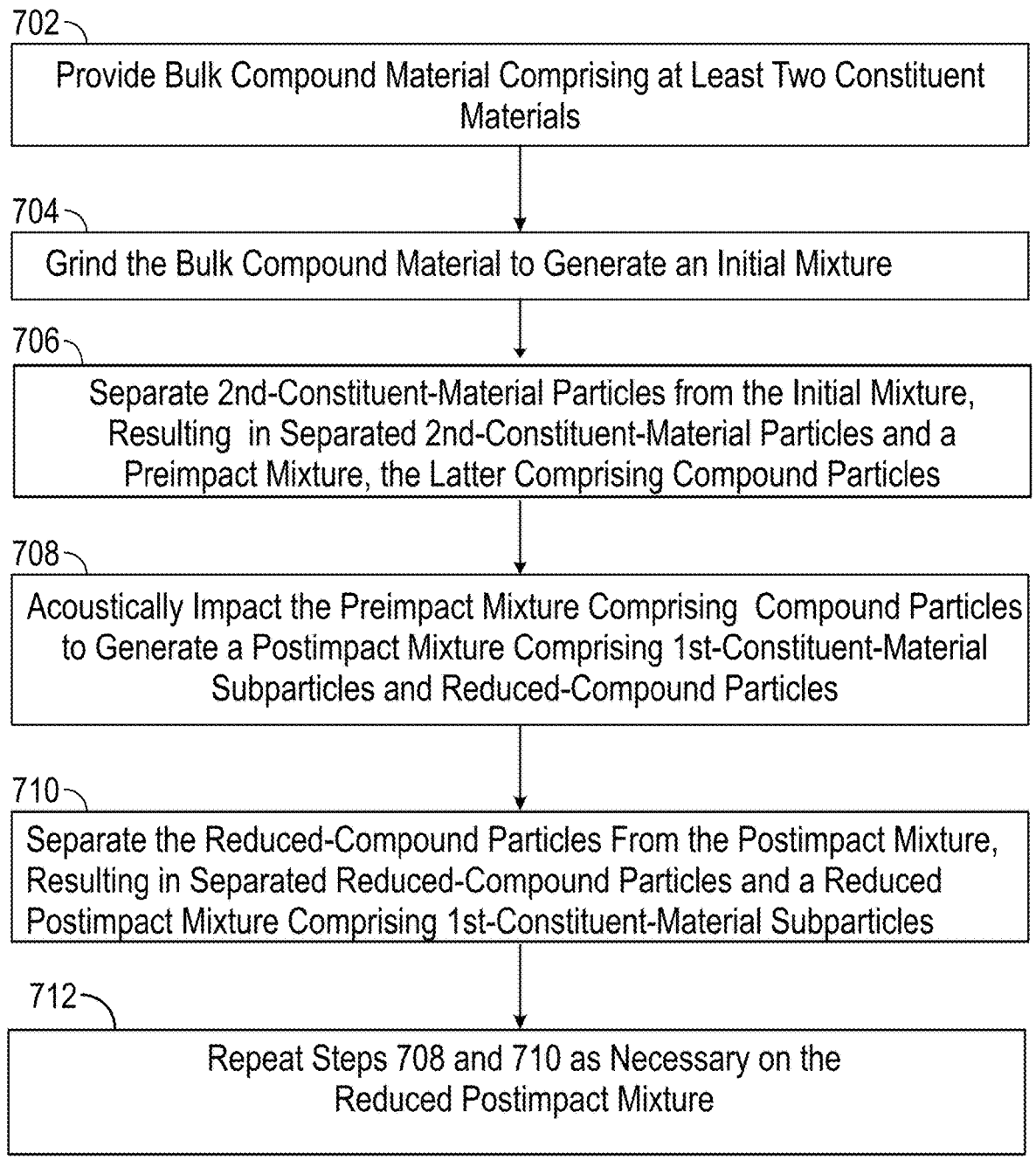
FIG. 7 shows a material extracting method according to an embodiment of the invention.

FIG. 7 shows a material extracting method comprising the steps according to an embodiment of the invention. The method starts at Step 702 by providing a bulk compound material comprising at least two constituent materials of different mechanical properties. At Step 704 the bulk compound is grinded to generate an initial mixture of molecular-sized particles. This can be accomplished using the grinder 104 in FIG. 1. In cases where the compound includes just two constituent materials, the initial mixture may include particles of the first material only, particle of the second material only, and compound particles. Next, in Step 706, particles of the second constituent material are separated from the other particles of the initial mixture, resulting in separate second-constituent-material particles and a preimpact mixture comprising compound particles. This can be accomplished using a first stage separator described in FIG. 1 (also referred to as a preimpact separator). Next, in Step 708, the preimpact mixture, including the compound particles, undergoes and acoustic-impacting. This acoustic impacting causes subparticles of the first material to separate from the compound particles. With the first-material subparticles separated from the compound particles, the compound particles can be considered reduced-compound particles.

If the original compound material had only A and B as compound materials, then separation of the A-subparticle from the compound particle would leave the reduced-compound particle as a second-material subparticle, i.e., B-subparticle. This can be accomplished using an HIT-type kinetic impactor. (Because HIT-type kinetic impactors operate on particles that are suspended in a fluid, the fluid for such a suspension could be introduced either during or after Step 704, or even before, during, or after Step 706.) Next, in Step 710, the reduced-compound particles are separated from the other particles present in the postimpact mixture, resulting in separated reduced-compound particles and a reduced postimpact mixture comprising the first-constituent-material particles and subparticles. This can be accomplished using the second separator described in FIG. 1. If further extraction efficiency is desired after Step 710, e.g., some of the compound particles that did not initially break up in step 708, wound up in the postimpact mixture and were outputted as a part of the reduced postimpact mixture. Steps 708 and 710 can be repeated using either the same or different impactor and separator.

Figure 2:
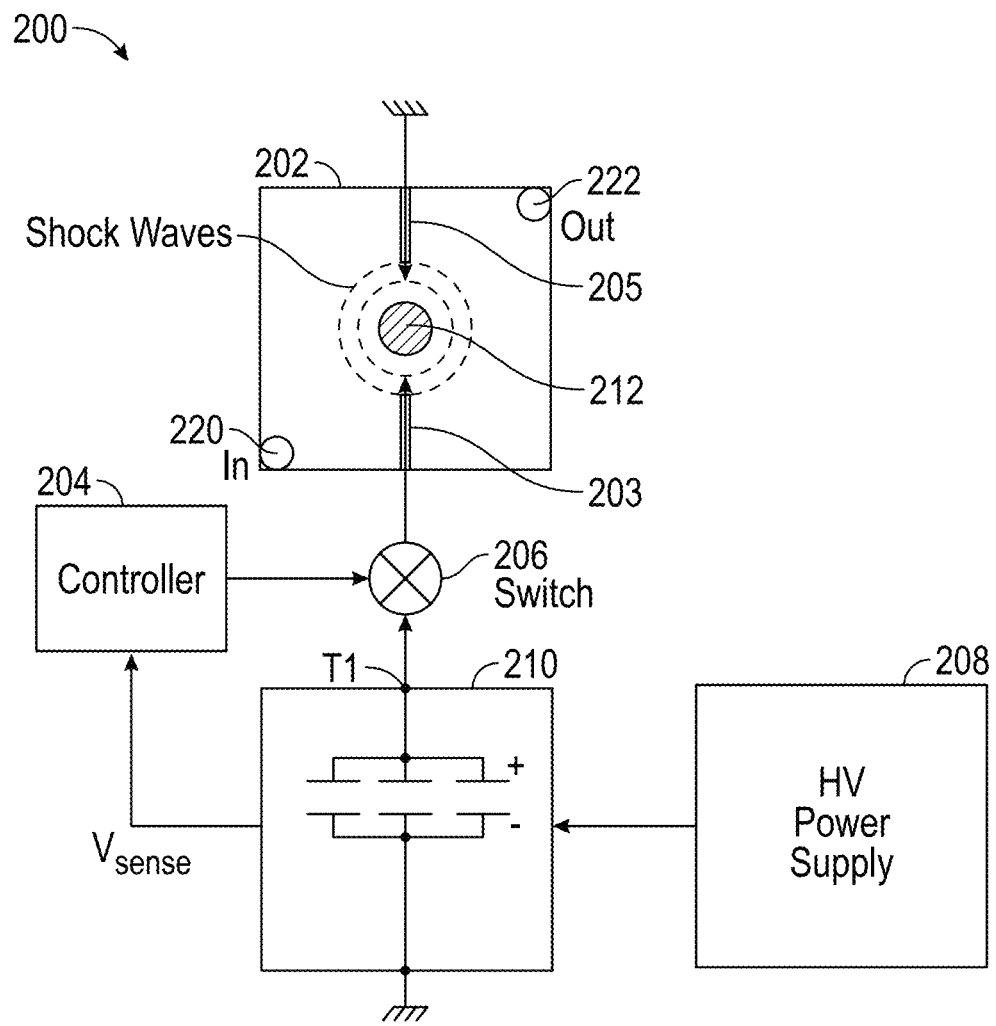
FIG. 2 shows a diagram of an electrical system for operating an HIT-type kinetic impactor according to an embodiment of the invention.
Figure 2:
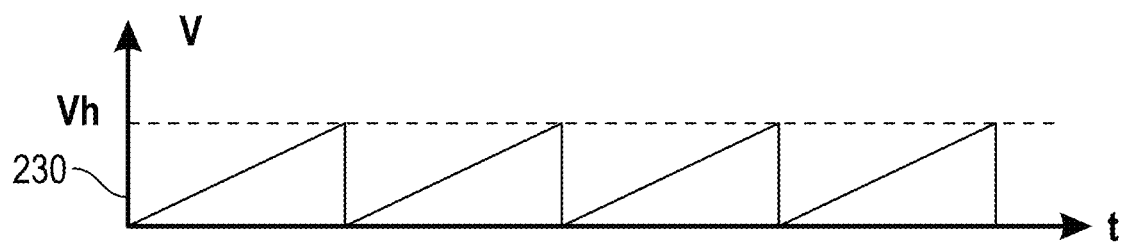
Figure 2:
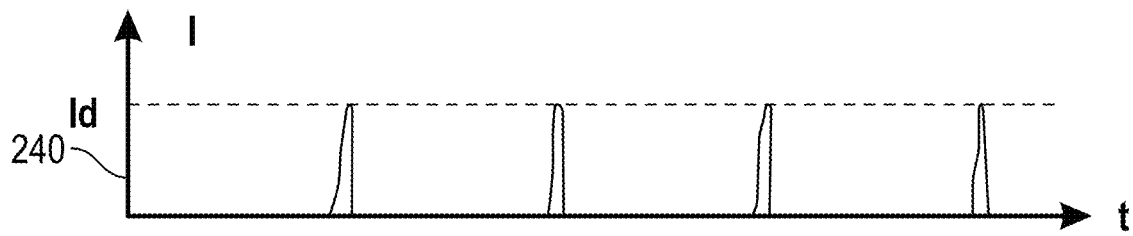

FIG. 2 shows a diagram of an electrical system for operating an HIT-type kinetic impactor subsystem according to an embodiment of the present invention. The system 200 comprises impactor housing 202, a controller 204, a high voltage switch 206, a high voltage power supply 208, and a bank of capacitors 210 that act as a capacitor(s) battery.

In FIG. 2, the housing 202 is shown as constituting a single chamber with two ports, an input port 220 and an output port 222. The input port 220 is used to deliver particles, or microorganisms, suspended in fluid (e.g., water or surface-active fluid) into the impactor for kinetic processing (shocks), and the output port 222 is used for outputting fluid-suspended subparticles, or broken up microorganisms, generated as the result of the impactor's kinetic processing.

A pair of gapped electrodes 203 and 205 are shown as being located inside the chamber 202. In the embodiment of FIG. 2, one electrode, 203, is coupled to the battery 210 via switch 206 and the other electrode, 205, is connected to ground. The controller 204 senses battery voltage and controls opening and closing of the switch 206. When the battery 210 is charged, by a high voltage power supply 208, to a predetermined high voltage, Vh, the controller 204 closes the switch 206, thereby connecting the battery terminal T1 with the electrode 203 inside the housing's chamber. This, in turn, causes Vh voltage level to appear at the electrode 203. With the voltage difference between the two electrodes being sufficiently high to cause an electrical breakdown of the fluid inside the chamber 202, as explained above, a plasma ball is created in the gap between the electrodes and an acoustic shockwave is generated.

FIG. 2 also illustrates the voltage and current profiles on the battery 210 during the charging and discharging time periods. (The voltage and current graphs in FIG. 2 show four such charging-discharging cycles.) Voltage graph 230 shows the battery voltage at terminal T1 increasing (charging) during the charging period from zero to Vh. This occurs when the switch 206 is open. When the switch closes and the electrical breakdown of the fluid inside the chamber occurs, the battery generates a current pulse, shown on the current graph 240 in FIG. 2 as current Id. This current pulse also corresponds to a pressure pulse (explosion) originating in the chamber 202 between the two electrodes. During this time, the battery 210 discharges from Vh to zero.

In the above-described embodiment, a single energy source 210 (e.g., a capacitor(s) battery, etc.) is electrically coupled to electrode 203 through a high voltage switch 206, to provide high voltage pulse(s) of voltage Vh, and to other electrode 205 (or impactor metal body) via ground, to close the current loop. In such an embodiment, capacitor battery 210 is charged to voltage +Vh and is connected through the high voltage switch 206 to the electrode 203, making it a positive electrode. To generate a high-voltage pulse across the two electrodes of the invented apparatus, switch 206 closes, connecting the capacitor 206 to the positive electrode 203. This results in the high voltage of value Vh appearing across the two electrodes, which causes the electrical breakdown of the gap between the electrodes, generating the plasma explosion.

The electrodes themselves are designed to conduct thousands, if not hundreds of thousands or millions of high voltage discharge pulses. Thus, they are designed to direct the current discharge as precisely as possible, without deforming or wearing out.

In addition, to enable high voltage discharge pulses to have steep (fast) rise and fall times, the high voltage cable that conducts the pulses to the positive electrode may be coaxial, having the insulation material such as ferrite. Because ferrites exhibit non-linear characteristic in magnetic fields due to their non-linear permeability, ferrites are particularly suitable for use as insulation materials in coaxial cables for HIT applications, where extremely fast rise and fall times of voltage pulses are needed.

Figure 3:
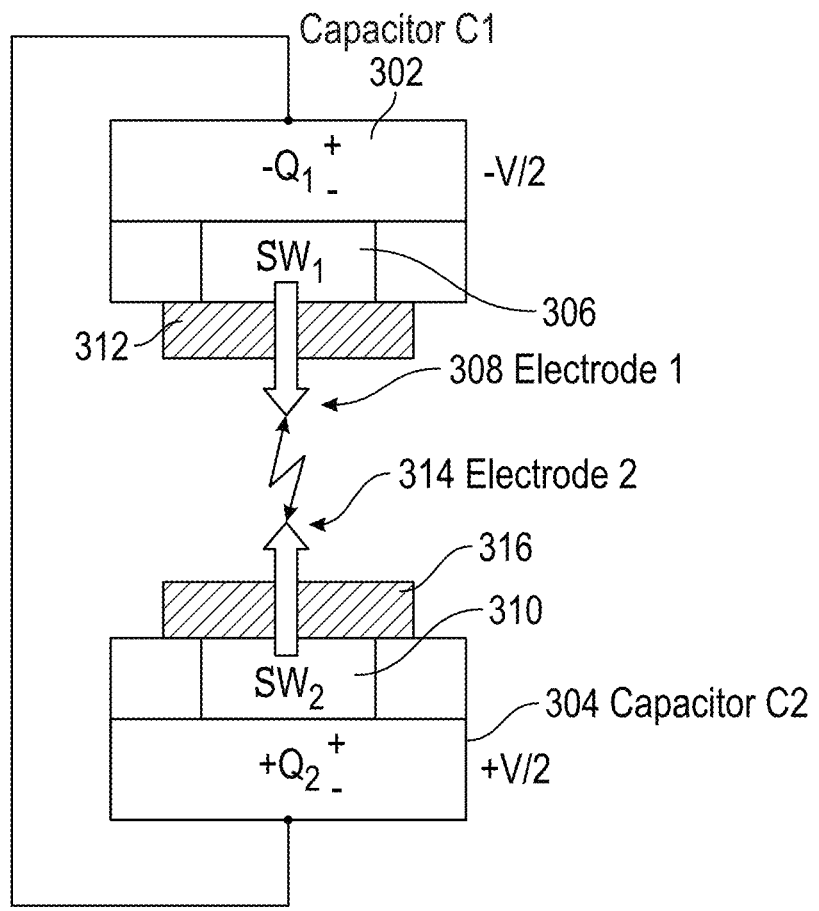
FIG. 3 illustrates another embodiment of electrically connecting the electrodes to energy source(s) for operating an HIT-type kinetic impactor according to an embodiment of the invention.

FIG. 3 shows another embodiment for electrically connecting the electrodes to energy source(s) for operating an HIT-type kinetic impactor according to an embodiment of the invention. In it, instead of using a single capacitor (or capacitor bank) that is charged to voltage V, the embodiment uses two capacitors (or capacitor banks) C1 (reference 302) and C2 (reference 304) having equal capacitances and connected in series. In this embodiment, each C1 and C2 is charged to V/2, which is half the voltage of the single-capacitor embodiment described above. As shown connected in FIG. 3, the charge on capacitor C1 will be viewed as $-Q_1$, and on capacitor C2 will be $+Q_2$. Because the two capacitors C1 and C2 are connected in series, the total voltage across the circuit will be 2*(V/2)=V, and the total combined charge in the circuit will be the sum of the magnitudes of both charges, i.e., $Q_\Sigma=|Q1|+|Q2|$. In addition, unlike the single-energy-source embodiment, which uses a single high-voltage switch to connect a capacitor battery to one electrode, the embodiment in FIG. 3 uses two separate high voltage switches, switch SW1 (reference 306) to connect capacitor C1 (reference 302) to Electrode 1 (reference 308) of the electrode pair and switch SW2 (reference 310) to connect capacitor C2 (reference 304) to Electrode 2 (reference 314) of the electrode pair. FIG. 3 also conceptually shows that a substantial portion of the Electrode 1 (reference 308) is surrounded by an insulator 312, and a substantial portion of the Electrode 2 (reference 314) is surrounded by an insulator 316. When both switches are closed (switched ON) simultaneously, a voltage of value V will appear across the electrodes. This in turn will cause electrical breakdown of the fluid, generating the plasma explosion discussed above and discharging each of the capacitors. The dual-capacitor configuration allows the designer to use capacitors that are rated for lower maximum voltages, which in turn can reduce the costs of the overall system.

In addition, if each of the capacitors in FIG. 3 is rated for and charged to voltage V, the overall voltage appearing across the electrodes will be 2*V. This, in turn, will allow for pulses of shorter duration and would also allow greater distance between the electrodes, which would increase efficiency of conversion from electrical energy to mechanical energy. As a result, the system will be less sensitive to the variation in fluid conductivity.

Figure 4:
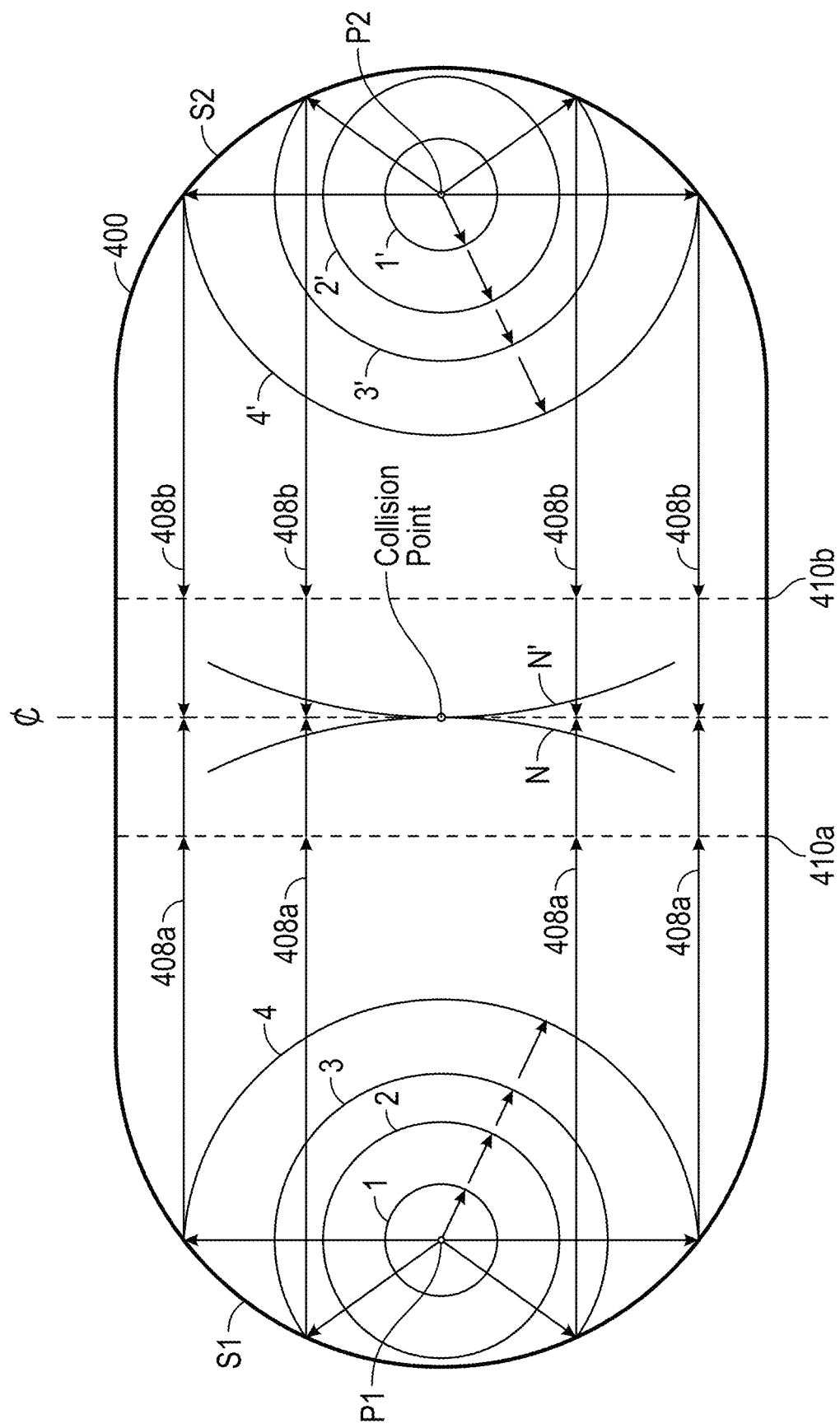
FIG. 4 illustrates an embodiment of a chamber in an HIT-type kinetic impactor for use in the invented system.

FIG. 4 illustrate another embodiment of a chamber of an HIT-type kinetic impactor for use in the invented system. In particular, FIG. 4 shows an embodiment of a single-chambered HIT-type kinetic impactor housing having two pairs of electrodes that create plasma explosions at two different locations in the chamber, designated as P1 and P2. Specifically. FIG. 4 shows a horizontal cross section of the chamber 400 in the plane between the electrodes of each respective electrode pair, where the plasma explosions occur. The chamber 400 includes a peripheral wall having a number of sections. Two of the wall sections. S1 and S2, have a symmetrical parabolic cylinder shape on the interior. The S1 and S2 sections form the sides of the chamber and face each other in a mirrored fashion, constituting a wall-section pair.

Each of the parabolic cylinders has a focus axis. The P1 and P2 locations lie along the focus axes of the respective cylindrical parabolic sidewalls S1 and S2. The concentric lines 1, 2, 3, 4 . . . N around P1 conceptually depict a shockwave originating at P1 (created by one electrode pair) and radiating (traveling), as represented by arrows between the concentric lines, in all the directions within the cross plane over time, such as 1 μsec, 2 μsec, 3 μsec, 4 μsec, . . . N μsec. The concentric lines 1', 2', 3'. 4' . . . N' around P2 depict a shockwave originating at P2 (created by the other electrode pair) and radiating (traveling), as represented by arrows between the concentric lines, in all the directions within the cross plane over time, such as 1 μsec, 2 μsec, 3 μsec, 4 μsec . . . N μsec after the explosion. A portion of the shockwave originating at P1 and traveling right without any sidewall reflections will meet a portion of the shock wave originating at P2 and traveling left without any sidewall reflections along collision plane, which in this cross-sectional figure is conceptually represented by a dashed line C. Assuming symmetry in the chamber's cross section, line C will be located half-way between the P1 and P2 points, and the first collision along line C is shown as occurring at a location designated as Collision Point.

A portion of the shockwave originating as P1 and initially traveling left, however, will be first reflected by the sidewall S1 and only then travel to the right. These reflections are conceptually illustrated by lines designated by reference 408a on the left side of FIG. 4 that are pointing to the right. Conversely, a portion of the shockwave originating at P2 and initially traveling right will be first reflected by the sidewall S2 and only then travel to the left. These reflections are conceptually illustrated by lines 408b on the right side of FIG. 4 that are pointing to the left. These portions of each respective shockwave will also collide along line C. (Note, a reflected portion of a shockwave, after it has been reflected from a sidewall, will present a flat wavefront. This is conceptually represented by dashed lines 410a and 410b.

As a result, any particle located along line C will experience a kinetic impact of twice the power as compared to a shock from a single plasma exposition. While the chamber 400 in FIG. 4 is described as including a single pair of parabolic cylindrical wall sections and two pairs of corresponding electrodes (one pair to generate a plasma explosion at P1 and another pair to generate a plasma explosion at P2), the present invention contemplates a chamber with a peripheral sidewall having any number of pairs of cylindrical sidewall sections.

Figure 5:
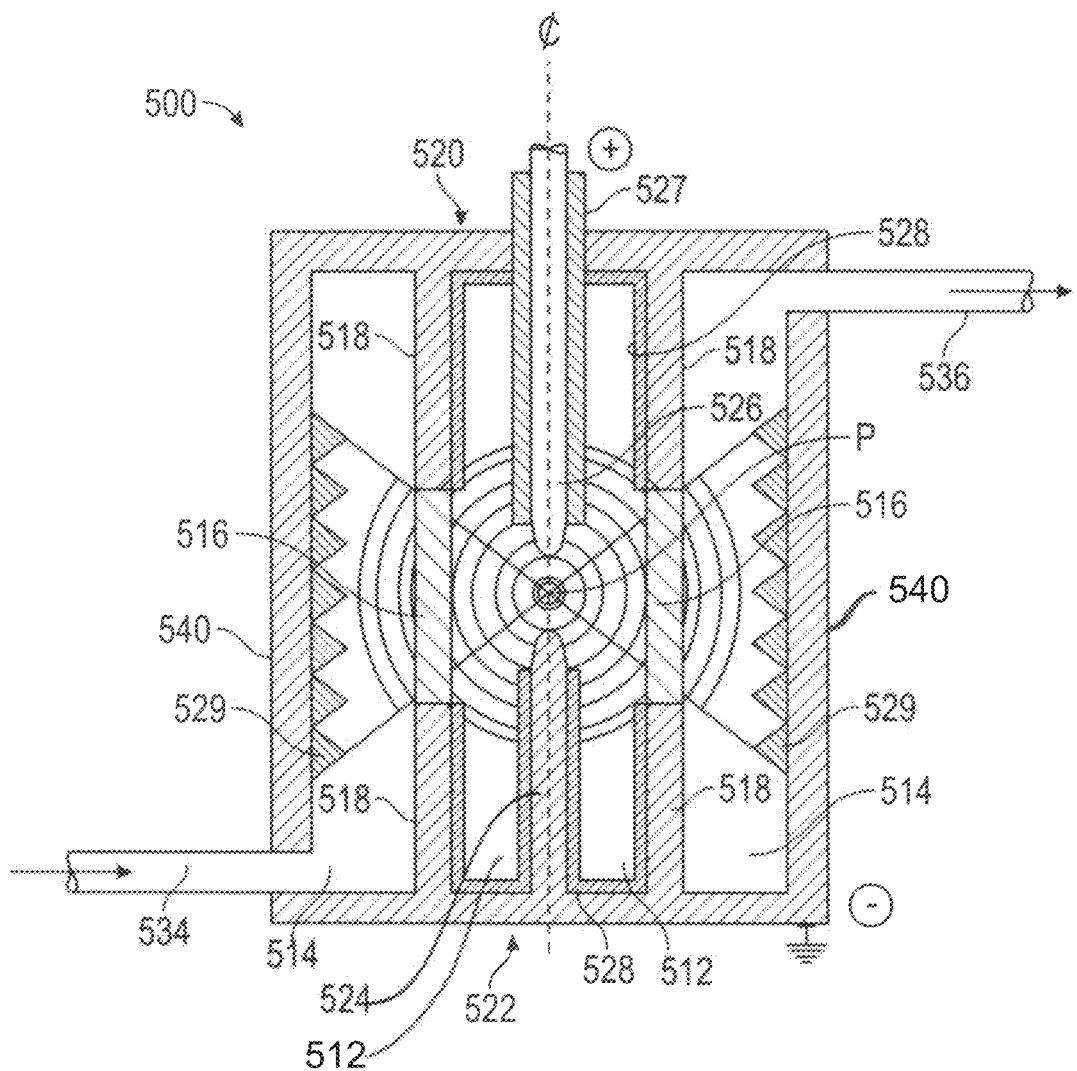
FIG. 5 illustrates a two-chambered hosing embodiment in an HIT-type kinetic impactor for use in the invented system.

FIG. 5 illustrates a two-chamber housing embodiment of an HIT-type kinetic impactor for use in the invented system. Although such two-chambered HIT-type kinetic impactor may be used in any material extracting applications, it is particularly beneficial for use in applications requiring destruction of pathogens in fluids (milk, pool water, etc.). Specifically, FIG. 5 illustrates a cross-section of the impactor's housing. The impactor has a housing 500 that includes two chambers, an inner chamber 512 and an outer chamber 514. The inner chamber 512 has a cylindrical or spherical shape, etc. Although in a preferred embodiment the outer chamber 514 also has a cylindrical shape, it could have other shapes as well, such as a square or rectangular shape with curved inner corners, a spherical shape, elliptical, equal pressure surface, etc. Other shapes are also contemplated by the present invention. In FIG. 5, both the inner chamber 512 and the outer chamber 514 are cylindrical.

On the exterior, the housing 500 includes a top wall 520, a bottom wall 522, and a sidewall(s) 540. On the inside, the housing 500 includes a tubular, interior wall that divides the space into an inner chamber 512 and an outer chamber 514. This interior wall includes two portions: (i) a tubular non-metallic portion 516 (preferably positioned midspan) that is joined on top and bottom with (ii) a tubular metallic portion 518. As explained below, the non-metallic portion 516 can be thought of as a membrane that allows shockwaves, generated in a fluid within the inner chamber 512, to pass through the membrane from the inner chamber 512 into a fluid in the outer chamber 514 without losing energy (or with an insubstantial energy loss). Importantly, the fluids in the inner and outer chambers need not be the same. For example, the fluid substantially filling the inner chamber could be water, while the fluid in the outer chamber, with suspended particles or microorganisms, could be milk, juice, etc. In another application, such as material extractions from PGM-plated ceramic, fluid substantially filling the inner chamber could be water, while the fluid in the outer chamber could be a surface-active fluid.

As shown in FIG. 5, the housing 500 also includes a metallic shaft 524 extending up from the bottom wall 522 along the inner chamber's central axis C. The metallic shaft 524 can act as a negative electrode (preferably ground) for conducting an HIT discharge pulse. The inner chamber 512 further includes a positive electrode 526 for conducting the HIT pulse, to create a plasma explosion inside the inner chamber 512. The positive electrode 526 passes through the hosing's top wall 520 and extends down into the inner chamber 512. While passing through the top wall 520, which is at the same electrical potential as the negative electrode 524, the positive electrode 526 is electrically insulated from the top wall 520 by an insulator 527. For example, the positive electrode 526 may be an inner conductor of a coaxial pair of conductors. The outer conductor may have a thick tubular sidewall that contacts the top wall 520 but is insulated from the inner conductor (positive electrode) by an insulating material (insulator).

The two electrodes are precisely gapped, such that when the inner chamber 512 is substantially filled with a known fluid (e.g., water) and sealed, the voltage level required to create the electrical breakdown of the fluid, generating the plasma explosion (depicted in FIG. 5 as reference "P"), could be determined in advance. Because the top wall 520, bottom wall 522, and portion 518 of the inner chamber are metallic, to guarantee that the electrical current of the discharge pulse will flow from the tip of the positive electrode 526 to the tip of the negative electrode 524, thereby creating the plasma explosion between the two electrode tips, the inner chamber 512 may be lined with an insulator 528 as shown in FIG. 5. The tips of one or both electrodes may be profiled to help direct the current flow during the discharge.

When a high voltage discharge pulse is applied between the two precisely gapped electrodes of the fluid-filled inner chamber 512, an electrical breakdown of the fluid inside the chamber creates an explosion within the fluid. At the moment of the breakdown, a discharge zone is formed, the pressure and temperature in which can reach over $10^{13}$ Pa and over 20,000 degrees Celsius. The discharge zone transforms into a relatively small plasma ball P in the fluid. The explosion generates a shockwave that creates a powerful impulse of kinetic energy into the fluid, which transmits the shockwave in all directions. To minimize energy loss of the shockwave as it passes from the fluid in the inner chamber through the membrane 516, acoustic impedance of the membrane should match the acoustic impedance of the fluid. For example, if the fluid in the inner and outer chambers is water, the acoustic impedance of the membrane 516 should preferably match the acoustic impedance of water. If the acoustic impedances of fluids in the two chambers are substantially different, several scenarios can arise. In one scenario, the acoustic impedance of the membrane 516 should be substantially equal to the acoustic impedance of the fluid in the inner chamber 512. In another scenario, the acoustic impedance of the membrane should be substantially equal to the acoustic impedance of the fluid in the outer chamber 514. In a third scenario, the acoustic impedance of the membrane can be in the range between the two impedances, such as in the middle. One possible embodiment of the membrane is a thin metallic membrane. Another could be a plastic or resin membrane, etc. Moreover, while in some embodiments the membrane can have a flat cylindrical shape (e.g., as shown in FIG. 5), in other embodiments the membrane can have a cylindrical shape with a periodically varying diameter. The latter embodiment would allow the membrane to expand and contract without being destroyed during operation.

Having described the details of the inner chamber 512 of the HIT impactor housing 500 in FIG. 5, the housing's outer chamber 514 will now be described.

The outer chamber 514 surrounds the inner chamber 512 along the inner chamber's tubular periphery. As a result, the outer chamber 514 has two sidewalls: (i) an exterior sidewall 540 which is also the exterior sidewall of the housing 500, and (ii) an interior sidewall, which doubles as the tubular wall of the inner chamber 512, comprising the membrane 516 and metallic portion 518. Specifically, the tubular wall of the inner chamber 512 is also the interior sidewall of the outer chamber 514. Thus, while one surface of the interior sidewall of the outer chamber 514 faces the outer chamber, the other surface of the interior sidewall faces the interior chamber 512.

The exterior sidewall of the outer chamber is also metallic. The two sidewalls of the outer chamber 514 are joined at the bottom and top by walls that are preferably also metallic. In FIG. 5, the two sidewalls of the outer chamber are shown as being joined by the housing's bottom wall 522 and its top wall 520. In one embodiment, shown in FIG. 5, the metallic sections of the apparatus are either integrally formed or securely joined together, such as by threaded connections. For example, the metallic housing can be formed by casting.

The outer chamber 514 includes a fluid-input port 534 and a fluid-output port 536. In the present invention, while the inner chamber 512 is designed to be substantially filled with a first fluid that is sealed inside it, the outer chamber 514 is designed to be filled with a second fluid that is moving (circulating) between the input and output ports 534 and 536, respectively. Although the fluid-input port 534 and the fluid-output port 536 could be located on the outer chamber's bottom wall 522 and top wall 520, respectively, in one preferred embodiment, shown in FIG. 5, both the input and output ports are located along the outer chamber's sidewall 540 as shown. This allows the fluid (e.g., water) that is injected (pumped) into the input port 534 to flow up toward its corresponding output port 536 in a spiral fashion.

Assuming the inner chamber 512 of the housing 500 is filled with a static fluid (e.g., water) and the outer chamber 514 of the housing 500 is filled with a circulating fluid (e.g., water or milk, etc.), operation of the HIT-type kinetic impactor with such a housing will now be described in further detail.

As explained above, a high voltage discharge pulse applied between the electrodes in the fluid-filled inner chamber 512 causes an electrical breakdown of the fluid, generating an explosion within the fluid at location P in FIG. 5. This explosion forces a powerful impulse of kinetic energy into the fluid, thus transmitting an acoustic shockwave in all directions. As the shockwave radiates out from the location P, it passes through the membrane 516 from the inner chamber 512 into the outer chamber 514 without losing energy (or without a substantial energy loss). Upon entry into the outer chamber 514, the shockwave travels through the fluid in the outer chamber ultimately impinging on the interior surface of the sidewall 540. To further reduce energy losses when the shockwave enters the outer chamber, acoustic impedance of the fluid in the second chamber should also preferably match the acoustic impedance of the fluid in the inner chamber. For example, if the fluid in the inner chamber is water, the fluid in the outer chamber should preferably also be water.

Because the shockwave does not pass through the metallic portion 518 of the interior chamber's sidewall (it only passes through the membrane 516), the metallic portion 518 acts as a baffle that controls (limits) the zone in the outer chamber through which the shockwave travels. As a result, the shock zone does not extend throughout the outer chamber but is limited to a specific volume of the outer chamber. To prevent (or reduce) the shockwave from reflecting off the interior surface of the sidewall 540 back into the outer chamber, the interior surface may be profiled to include damping features to dissipate the shockwave. Reference 529 illustrates a cross-section of one such possible damper profile that could be included along the interior surface of the sidewall 540. The damping feature may also be extended to other interior surfaces of the outer chamber 514.

In some cases, a reflection of the shockwave from an interior of either the inner chamber 512 and/or the outer chamber 514 could be desirable. In those cases, sidewall surfaces could be formed to reflect the shockwave in desired directions.

It should be noted that the present invention is not limited to the damping features shown in FIG. 5, and other known damping profiles could be used. Moreover, except for the membrane 516, a damper may also be used along the interior surface of the inner chamber 512. It is preferable, however, not to include any damping features on either surface of the membrane 516.

With the shock zone in the outer chamber as illustrated in FIG. 5, any element suspended in the fluid that happens to be located within the shock zone will get hit by the shockwave(s). As discussed above, if the element is a particle of composite material, such as PGM-plated ceramic (e.g., ceramic composite used in catalytic converters of vehicles using internal combustion engines), due to very different densities of the two materials, the shockwave would cause the PGM to separate from the ceramic. Because some of the shockwave's energy will be absorbed in the fluid as the wave travels through the outer chamber, the distance between the sidewalls of the outer chamber 514 will be one of the variables that determine the required voltage level of the discharge pulse.

When using HIT-type kinetic impactors for killing microorganisms in fluids, the method described above concerning FIG. 7, reduces to Step 708, in which fluid-suspended microorganisms are killed as they pass through a shock zone within HIT's impact chamber.

For any housing embodiment of an HIT-type kinetic impactor, the voltage level, duration, and repetition (frequency) of high voltage pulses are preferably controlled, so that the resulting shock waves would be sufficiently powerful in their operating zone to achieve its intended function, e.g., killing living organisms, separating various composites into their constituent materials, etc. The voltage level can be controlled by a power regulator (power source) that charges one or more high voltage capacitors that are then discharged via a switch. Duration of the pulse can also be controlled. In one preferred embodiment, the pulse width (duration) should be less or equal to about 100 nanoseconds. In fluids (e.g., water), an impulse of such a duration can generate a shockwave pulse traveling at supersonic speeds and having a thickness of less than 100 nanometers.

Concerning the housing embodiment in FIG. 5, because the shock zone may not cover the full volume of the outer chamber 514, the shockwave may not impact the elements suspended in the fluid outside the shock zone. As a result, those elements must somehow be moved into the shock zone, to be impacted on a subsequent shock(s). This can be accomplished by repeated high voltage discharges across the electrodes while circulating the fluid in the outer chamber via the fluid-input and fluid-output ports 534 and 546, respectfully. Frequency of the high voltage discharge pulses is directly proportional to the volume of fluid in the outer chamber 514 and the speed which the fluid, with elements suspended in it, flows through the shock zone on its way to the output port 536. In one preferred embodiment, pulse frequency preferably about up to 10 Hz, but could go up to about 10 kHz or even higher. (Pulse frequency may vary.) In cases where it is preferable to lower the frequency of the discharge pulses, the fluid flow in the outer chamber is made to be spiral. Such spiral flow can be achieved by proper positioning of the intake and output ports along the sidewall 540. In addition, to create a spiral flow, the fluid may enter the intake port 534 horizontally and from the side of the housing tangentially with respect to the sidewall 540, flows up in a spiral fashion, and exits through the output port 536 in the same fashion.

While FIG. 5 shows a single stage HIT-type kinetic impactor operation, the invention is not so limited, and contemplates having a multistage HIT operation. In a multistage embodiment, fluid exiting from an output port of a chamber of one stage flows into an input port of a chamber of the next stage. This is illustrated in FIG. 6 for a two-chamber housing embodiment.

Figure 6:
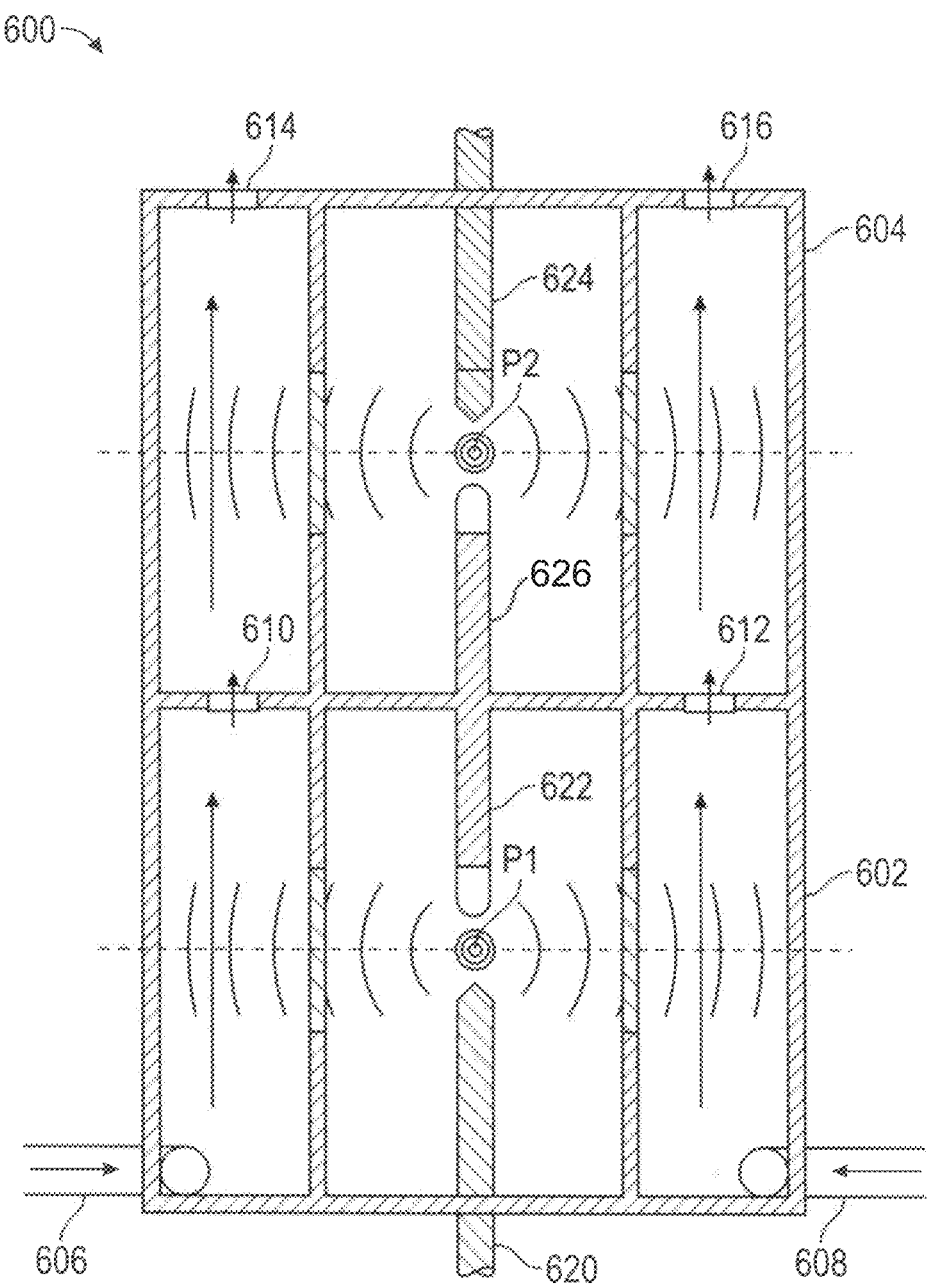
FIG. 6 illustrates a multi-stage chambering in an HIT-type kinetic impactor for use in the invented system.

FIG. 6 shows multi-staging of an HIT-type impactor for use in the invented system. FIG. 6 illustrates a housing 600 comprising two stages, a first (initial) stage 602 and a second (next) stage 604. Similar to the two-chambered housing described in FIG. 5, each stage in FIG. 6 also has two chambers, inner and outer (for clarity, the dampers and insulators, such as those in FIG. 5, are not shown in FIG. 6). In FIG. 6, first stage 602 has two fluid intake ports (606 and 608, respectively) and two fluid output ports (610 and 612, respectively). The fluid output ports 610 and 612 of the first stage either double as, or are joined with, the intake ports of the second stage 604. In addition, the second stage 604 also includes two fluid output ports 614 and 616. The inner chamber of the first stage includes a pair of positive and negative electrodes. 620 and 622, respectively; and the inner chamber of the second stage also includes a pair of positive and negative electrodes 624 and 626, respectively. When the housing 600 is a cast metallic housing, the upper wall 618 of the first stage could also double as the lower wall of the second stage. In the embodiment of FIG. 6, the particles suspended in fluid enter through the two input ports of the first stage and flow through the shock zone in the outer chamber of the first stage on their way to the first stage output ports. Because the output ports of the first stage are either coupled to or double as the input ports of the second stage, particles flowing out of the outer chamber of first stage flow through the input ports of the outer chamber of the next stage. Thus, particles flowing out of stage 602 flow into the next stage 604. Once in the outer chamber of the next stage 604, the particles continue to flow toward the output ports of stage 604 and pass through the shock zone of the second stage.

While the multi-staging HIT operation was described above with respect to a dual-chambered HIT impactor, multi-stage operation also applies to single-chambered HIT impactors, in which the electrodes and the fluid-suspended particles are in the same chamber. A single-chambered HIT impactor embodiments could simplify impactor design.

While the foregoing descriptions may disclose specific values, unless expressly stated otherwise, other specific values may be used to achieve similar results. Further, the various features of the foregoing embodiments may be selected and combined to produce numerous variations of improved systems.

In the foregoing specification, exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings, and therefore the scope of the invention is to be limited only by the claims.

Moreover, in this document, relational terms such as first and second, up and down, and the like may be used solely to distinguish one entity or action from another entity or action without necessarily requiring or implying any actual relationship or order between such entities or actions. The terms "comprise(s)", "comprising", "has", "having", "includes", "including", "contains", "containing" or any other variation thereof, are intended to cover a non-exclusive inclusion, so that a process, method, article, or apparatus that comprises, has, includes or contains a list of elements does not include only those elements but may include other elements not expressly listed or inherent to such process, method, article, or apparatus. An element preceded by "comprises . . . a" "has . . . a", "includes . . . a" or "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially". "essentially", "approximately", "about" or any other version thereof, are defined as being close to as understood by one of ordinary skill in the art. The term "coupled" as used herein is defined as connected, although not necessarily directly. A device or structure that is "configured" in a certain way is configured in at least that way but may also be configured in ways that are not listed.

In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claim is:

1. An impactor for kinetically impacting a compound material comprising constituent materials of different mechanical characteristics, the impactor comprising:
 a chamber configured to be substantially filled with a liquid, the chamber including a peripheral wall comprising a pair of wall-sections facing each other, wherein an interior surface of each wall-section of the pair of wall-sections has a cylindrical parabolic shape; and
 a shockwave generator located within the chamber, the shockwave generator comprising a plurality of pairs of gapped electrodes,
 wherein the shockwave generator is configured to generate a shockwave by causing an electrical breakdown of the liquid in an electrode gap, for impacting a preimpact mixture comprising a plurality of compound particles, wherein each compound particle comprises a first constituent material and a second constituent material;
 wherein each wall-section of the pair of wall-sections is associated with a corresponding pair of gapped electrodes of the plurality of pairs of gapped electrodes;
 wherein, for each wall-section of the pair of wall-sections, the electrode gap between the gapped electrodes of the wall-section's corresponding pair of gapped electrodes coincides with a focus axis of the wall-section's cylindrical parabolic shape, such that a portion of the shockwave reflecting from the wall-section's interior surface presents a flat wavefront;
 wherein the shockwave is able to cause the first constituent material to separate from an at least one compound particle of the plurality of compound particles, resulting in a postimpact mixture comprising (i) an at least one first-constituent-material subparticle and (ii) an at least one reduced-compound particle comprising the second constituent material; and
 wherein the chamber further comprises (i) an input port for allowing the preimpact mixture suspended in the liquid to enter the chamber, and (ii) an output port for allowing the postimpact mixture suspended in the liquid to exit the chamber.

2. The impactor of claim 1, wherein the liquid comprises a surface-active fluid.

3. An impactor for kinetically impacting compound material comprising constituent materials of different mechanical characteristics, the impactor comprising:
 a first chamber configured to be substantially filled with a first fluid;
 an acoustic shockwave generator located within the first chamber, the acoustic shockwave generator comprising a pair of gapped electrodes;
 a second chamber fluidly isolated from the first chamber by an interior wall, the second chamber comprising
  (i) an input port for allowing a preimpact mixture suspended in a second fluid to enter the impactor, wherein the preimpact mixture comprises a plurality of compound particles, each compound particle of the plurality of compound particles comprises a first constituent material and a second constituent material, and
  (ii) an output port for allowing a postimpact mixture suspended in the second fluid to exit the impactor;
 wherein the acoustic shockwave generator is configured to generate an acoustic shockwave for impacting the preimpact mixture by causing an electrical breakdown of the first fluid in a gap between the pair of gapped electrodes,
 wherein the acoustic shockwave is able to cause the first constituent material to separate from an at least one compound particle of the plurality of compound particles, resulting in the postimpact mixture comprising (i) an at least one first constituent-material subparticle and (ii) an at least one reduced-compound particle comprising the second constituent material; and
 wherein the interior wall comprises a shockwave-transmission section configured to transmit the acoustic shockwave from the first chamber to the second chamber without the acoustic shockwave losing a substantial amount of energy.

4. The impactor of claim 3, wherein the first fluid is identical to the second fluid.

5. The impactor of claim 4, wherein the first fluid comprises a surface-active fluid.

* * * * *